(12) United States Patent
Chen et al.

(10) Patent No.: US 11,508,185 B2
(45) Date of Patent: Nov. 22, 2022

(54) METHOD AND SYSTEM FOR COLLECTING FACIAL RECOGNITION DATA

(71) Applicant: QNAP SYSTEMS, INC., New Taipei (TW)

(72) Inventors: Chun-Yen Chen, New Taipei (TW); Chan-Cheng Liu, New Taipei (TW); Ting-An Lin, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 211 days.

(21) Appl. No.: 17/104,278

(22) Filed: Nov. 25, 2020

(65) Prior Publication Data

US 2021/0397818 A1 Dec. 23, 2021

(30) Foreign Application Priority Data

Jun. 22, 2020 (TW) ................................ 109121029

(51) Int. Cl.
*G06V 40/16* (2022.01)
*G06K 9/62* (2022.01)
(Continued)

(52) U.S. Cl.
CPC ......... *G06V 40/172* (2022.01); *G06K 9/6256* (2013.01); *G06N 3/04* (2013.01);
(Continued)

(58) Field of Classification Search
None
See application file for complete search history.

(56) References Cited

U.S. PATENT DOCUMENTS

| 7,693,310 | B2 * | 4/2010 | Kato | G06V 40/167 382/103 |
| 9,117,109 | B2 | 8/2015 | Nechyba et al. | |
| 9,275,269 | B1 | 3/2016 | Li et al. | |

FOREIGN PATENT DOCUMENTS

| TW | 202001783 | 1/2020 |
| TW | 202013245 | 4/2020 |

OTHER PUBLICATIONS

Taiwan Patent Office, Office Action dated Jul. 30, 2021, Taiwan.

* cited by examiner

*Primary Examiner* — Leon Flores
(74) *Attorney, Agent, or Firm* — WPAT, PC

(57) ABSTRACT

A method for collecting facial recognition data includes: locating a first face area from an Nth image frame; extracting a first facial feature defined with S factors; acquiring a second facial feature extracted from a second face area shown in an (N−1)th image frame at a corresponding position; determining whether the first face area is relevant to the second face area, and assigning to the first face area a tracing code; determining whether to store the first facial feature according to a similarity level of the first facial feature to existent data; storing and inputting the first facial feature into a neural network to generate an adjusted feature defined with T factors if the similarity level of the first facial feature to the existent data is not lower than a preset level, wherein T is not smaller than S; acquiring adjusted data generated by inputting the existent data into the neural network; determining whether the person is a registered one according to a similarity level of the adjusted feature to adjusted data; and using the stored first facial feature for training the neural network if the person is a registered one.

12 Claims, 4 Drawing Sheets

(51) Int. Cl.
*G06N 3/04* (2006.01)
*G06N 3/08* (2006.01)
*G06V 40/50* (2022.01)

(52) U.S. Cl.
CPC ............ *G06N 3/08* (2013.01); *G06V 40/161* (2022.01); *G06V 40/171* (2022.01); *G06V 40/50* (2022.01)

METHOD AND SYSTEM FOR COLLECTING FACIAL RECOGNITION DATA

FIELD OF THE INVENTION

The present invention relates to a facial recognition technology, and in particular to a method for collecting facial recognition data and a system for collecting facial recognition data.

BACKGROUND OF THE INVENTION

Existing facial recognition systems are generally based on images collected when a user register recognition data for facial feature extraction and facial recognition training. Due to the limited number of images that can be input when registering the recognition data and limited face orientations that can be taken, such facial recognition systems are actually built on limited database for recognition operations. For acquiring facial recognition data in a variety of face orientations, many requirements and constraints need to be considered and dealt with when setting up cameras. It would cause problems in setting up the system.

SUMMARY OF THE INVENTION

Therefore, the present invention provides method and system for collecting facial recognition data, in which facial recognition data are added progressively during a facial recognition process, thereby effectively ameliorating problems caused by insufficient database.

In an aspect of the present invention, a method for collecting facial recognition data from an image stream comprises: locating a first face area of a person to be recognized from an Nth image frame of the first image stream; extracting a first facial feature from the first face area, wherein the first facial feature is defined with S factors; acquiring a second facial feature extracted from a second face area shown in an (N−1)th image frame of the first image stream at a position corresponding to the first face area, wherein the (N−1)th image frame is generated prior to the Nth image frame; executing a first determining step to determine whether the first face area is relevant to the second face area or not, and assigning to the first face area a tracing code, whose number varies with a result of the determining step; executing a second determining step to determine whether to store the first facial feature according to a similarity level of the first facial feature to at least one existent facial feature data; storing the first facial feature and inputting the first facial feature into a first neural network to generate an adjusted first facial feature if the similarity level of the first facial feature to at least one existent facial feature data is determined to be higher than or equal to a preset level, wherein the adjusted first facial feature is defined with T factors, where T is not smaller than S; acquiring at least one adjusted existent facial feature data, each defined with the T factors and previously generated by inputting the at least one existent facial feature data defined with the S factors into the first neural network; executing a third determining step to determine whether the person to be recognized is a registered person or not according to a similarity level of the adjusted first facial feature to each of the at least one adjusted existent facial feature data; and using the stored first facial feature as a material for training the first neural network if the person to be recognized is determined to be a registered person.

In another aspect of the present invention, a system for collecting facial recognition data comprises: a first image pickup device installed at a first position for picking up images from a first shooting region to generate a first image stream; a facial feature database containing therein at least one existent facial feature data, each of which corresponds to a registered person; and a processing device electrically connected to the first image pickup device and the facial feature database. The processing device executes the method for collecting facial recognition data as described above.

In further aspect of the present invention, a method for collecting facial recognition data from a first image stream and a second image stream, wherein the first image stream and the second image stream respectively include a Kth image frame and a Jth image frame simultaneously picked up from respective shooting regions with an overlapping zone, comprises: locating a first face area of a person to be recognized from the Kth image frame of the first image stream; extracting a first facial feature from the first face area; determining whether a second face area exists in the Jth image frame of the second image stream at the same position where the first face area is disposed in the Kth image frame of the first image stream; acquiring a second facial feature previously extracted from the second face area and stored in a facial feature database; and correlating the second facial feature to the person to be recognized.

In accordance with yet another aspect of the present invention, a system for collecting facial recognition data comprises: a first image pickup device installed at a first position for picking up images from a first shooting region to generate a first image stream; a second image pickup device installed at a second position for picking up images from a second shooting region to generate a second image stream, wherein the second shooting region has an overlapping zone with the first shooting region; a facial feature database containing therein at least one existent facial feature data, each of which corresponds to a registered person; and a processing device electrically connected to the first image pickup device, the second image pickup device and the facial feature database. The processing device executes the method for collecting facial recognition data as described above.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
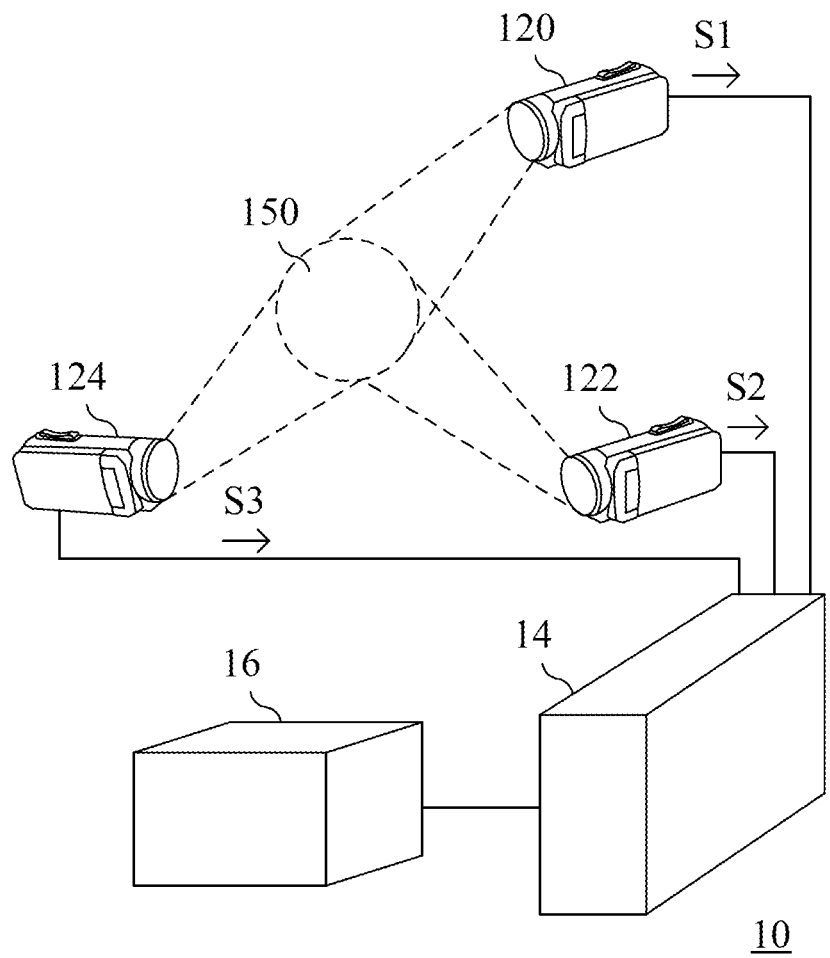
FIG. 1 is a schematic architecture of a system for collecting facial recognition data according to an embodiment of the present invention.

As shown in FIG. 1, a system 10 for collecting facial recognition data according to an embodiment of the present invention includes image pickup devices, e.g. cameras 120, 122 and 124, a processing device 14 and a facial feature database 16. In this embodiment, the cameras 120, 122 and 124 are respectively installed at designated locations and oriented in designated directions in order to pick up images on specific conditions. Accordingly, images streams S1, S2 and S3 are generated by the cameras 120, 122 and 124, respectively. The locations and orientations of the cameras 120, 122 and 124 can be optionally adjusted according to practical requirements so that a first specific area covered by the camera 120, a second specific area covered by the camera 122 and a third specific area covered by the camera 124 can completely overlap, partially overlap, or do not overlap at all. The facial feature database 16 includes at least one feature data, and each feature data corresponds to a registered user. The processing device 14 is electrically coupled to the cameras 120, 122 and 124 and the facial feature database 16, and receives the image streams S1, S2, and S3 from the cameras 120, 122, and 124. The processing device 14 then processes the image streams S1, S2, and S3 with reference to feature data stored in the facial feature database 16.

Hereinafter, processing of the image stream S1 is taken as an example to illustrate the details of the technology, and other image streams, e.g. image stream S2 or image stream S3, can be processed in similar ways. In order to make it easy for those skilled in the art to understand the technology provided herein, the following descriptions will be made with reference to FIG. 1, FIG. 2 and FIG. 3.

Figure 2:
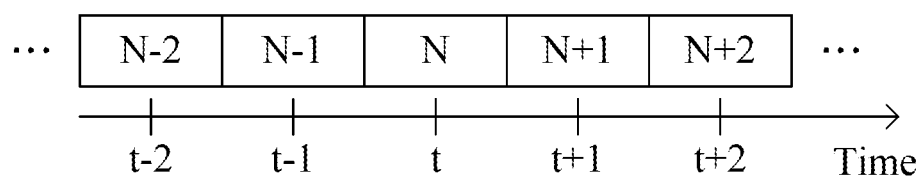
FIG. 2 is a scheme illustrating a timing sequence of an image stream involved in a method for collecting facial recognition data according to an embodiment of the present invention.

As shown in FIG. 2, the image stream S1 includes a sequence of image frames. For example, the camera 120 produces an (N−2)th image frame at a time point (t−2), produces an (N−1)th image frame at a time point (t−1), produces an Nth image frame at a time point t, produces a (N+1)th image frame at a time point (t+1), produces a (N+2)th image frame at a time point (t+2), and so on. The (N−1)th image frame follows the (N−2)th image frame; the Nth image frame follows the (N−1)th image frame; the (N+1)th image frame follows the Nth image frame; and the (N+2)th image frame follows the (N+1)th image frame. The technology provided in this embodiment according to the present invention performs similar operations to process each of the image frames, and a next image frame will not be processed until processing of a preceding image frame has been completed. That is, the processing device 14 will process the (N−1)th image frame after finishing processing the (N−2) image frame. Likewise, the processing device 14 will process the Nth image frame after finishing processing the (N−1) image frame, process the (N+1)th image frame after finishing processing the N image frame, and process the (N+2)th image frame after finishing processing the (N+1) image frame.

Hereinafter, processing of the Nth image frame of the image stream S1 generated by the camera 120 is taken as an example to illustrate the process with reference to FIG. 3. After the processing device 14 receives the image stream S1 (Step S300), the processing device 14 locates one or more face area, which are defined as first face area, in the Nth image frame, and each of the first face area is linked to a person, who is presumed to be an unknown person and defined as a first person to be recognized (Step S302). It should be noted that when more than one face area is shown in the same image frame, differently located first face area will be presumed to link to different first persons to be recognized.

Subsequently, the processing device 14 extracts a set of first facial features from the Nth image frame (Step S304). The set of first facial features include facial features respectively found in all the first face area while processing the Nth image frame. Following Step S304, the processing device 14 retrieves a set of second facial features from the facial feature database 16 (Step S306). The second facial features are previously extracted from all face area, which are defined as second face area, shown in the (N−1)th image frame and stored in the facial feature database 16. The processing device 14 then determines whether a first face area and its corresponding second face area are correlated to each (Step S308), for example, in view of spatial correlation. The determination of spatial correlation can be executed by way of many currently available algorithms. For example, the spatial correlation can be determined according to an overlapping ratio between the first face area and the second face area or a distance from a center of gravity of the first face area to a center of gravity of the second face area, or by executing the Kalman Filter algorithm. In addition, there are still a variety of prior art available to implement determination of spatial correlation between two area and known by those skilled in the art, so it is not to be redundantly described herein.

Subsequently, the processing device 14 processes the first face area differentially based on the correlation determined in Step S308. If the correlation shows that the first face area is relevant to the second face area, the first face area is assigned with a first tracing-code number (Step S310). Otherwise, the first face area is assigned with a second tracing-code number (Step S312). In practice, each face area corresponds to an exclusive tracing-code number, and the tracing-code numbers corresponding to different face area in the same image frame are hypothetically set to be different from one another.

Figure 4:
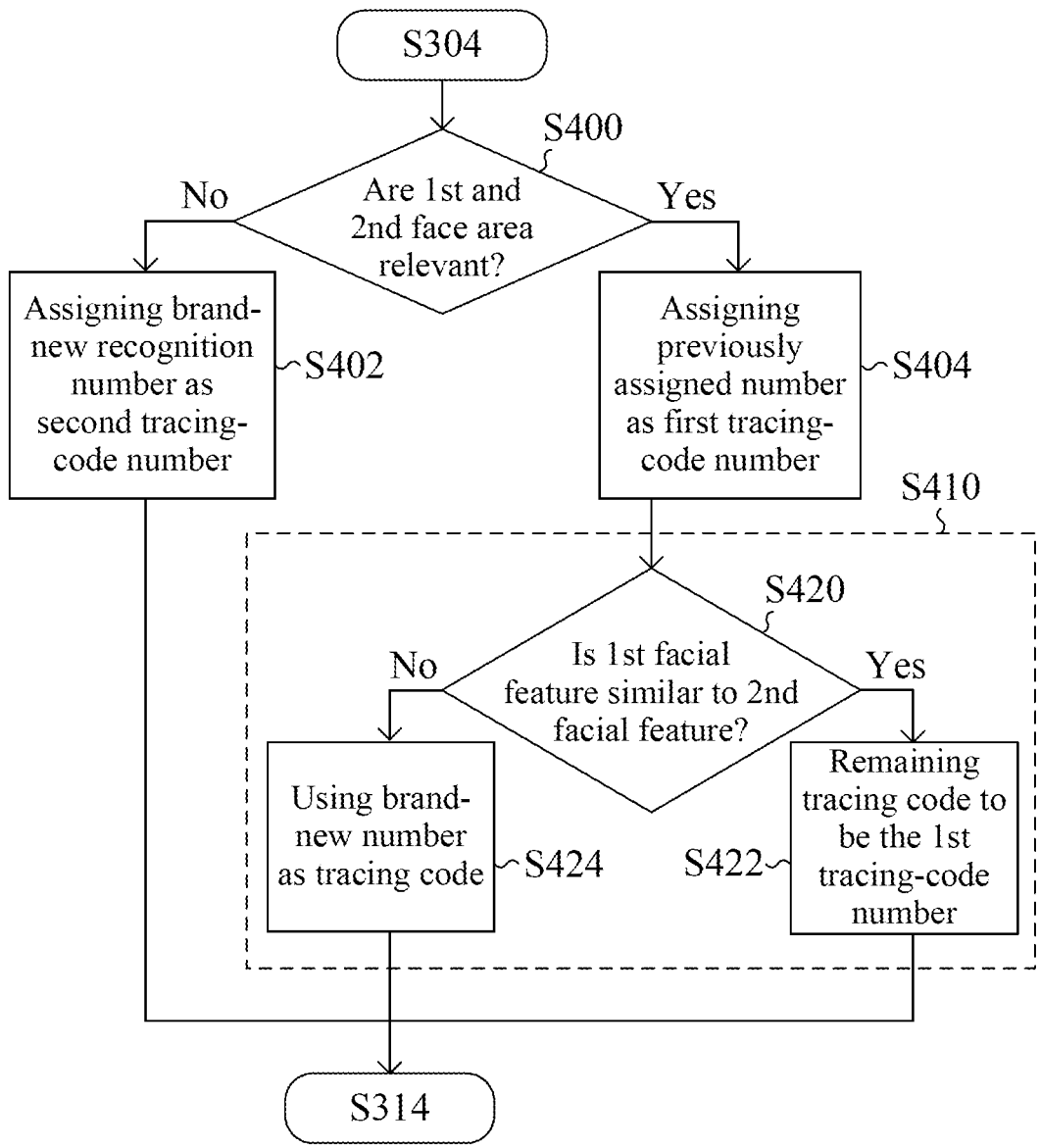
FIG. 4 is a flowchart exemplifying the implementation details of Steps S308-S312 shown in the flowchart of FIG. 3.

The above Steps S308, S310 and S312 will be described in more detail with reference to FIG. 4. As shown, the processing device 14 determines whether the first face area is relevant to the corresponding second face area according to their positions (Step S400). If the first face area is determined not to be relevant to its corresponding second face area, it is indicated that the first face area belongs to a person just entering a shooting zone of the camera 120. Accordingly, the processing device 14 assigns a brand-new recognition number to the first face area to serve as the second tracing-code number (Step S402). On the contrary, if the first face area is determined to be relevant to its corresponding second face area, it is indicated that the first face area and the second face area might belong to the same person. Accordingly, the processing device 14 assigns the same number as that previously assigned to the second face area to the first face area to serve as the first tracing-code number (Step S404). The tracing code of the first face area will be confirmed once more later in Step S410 according to the similarity of the first facial feature of the first face area to the second facial feature of the corresponding second face area.

Step S410 includes a sub-step of determining whether the similarity of the first facial feature of the first face area to the second facial feature of the corresponding second face area is higher than or equal to a preset first level (Step S420). If positive, it is indicated that the first face area and the second face area are likely to belong to the same person, and thus the tracing code of the first face area remains to be the first tracing-code number (Step S422). In other words, the same number as that previously assigned to the corresponding second face area can be used as the tracing code of the first face area. On the other hand, if it is determined that the similarity of the first facial feature of the first face area to the second facial feature of the corresponding second face area is lower than the preset first level in Step S420, it is indicated that the first face area and the second face area belong to different persons, and the brand-new number is used as the tracing code of the first face area (Step S424).

Figure 3:
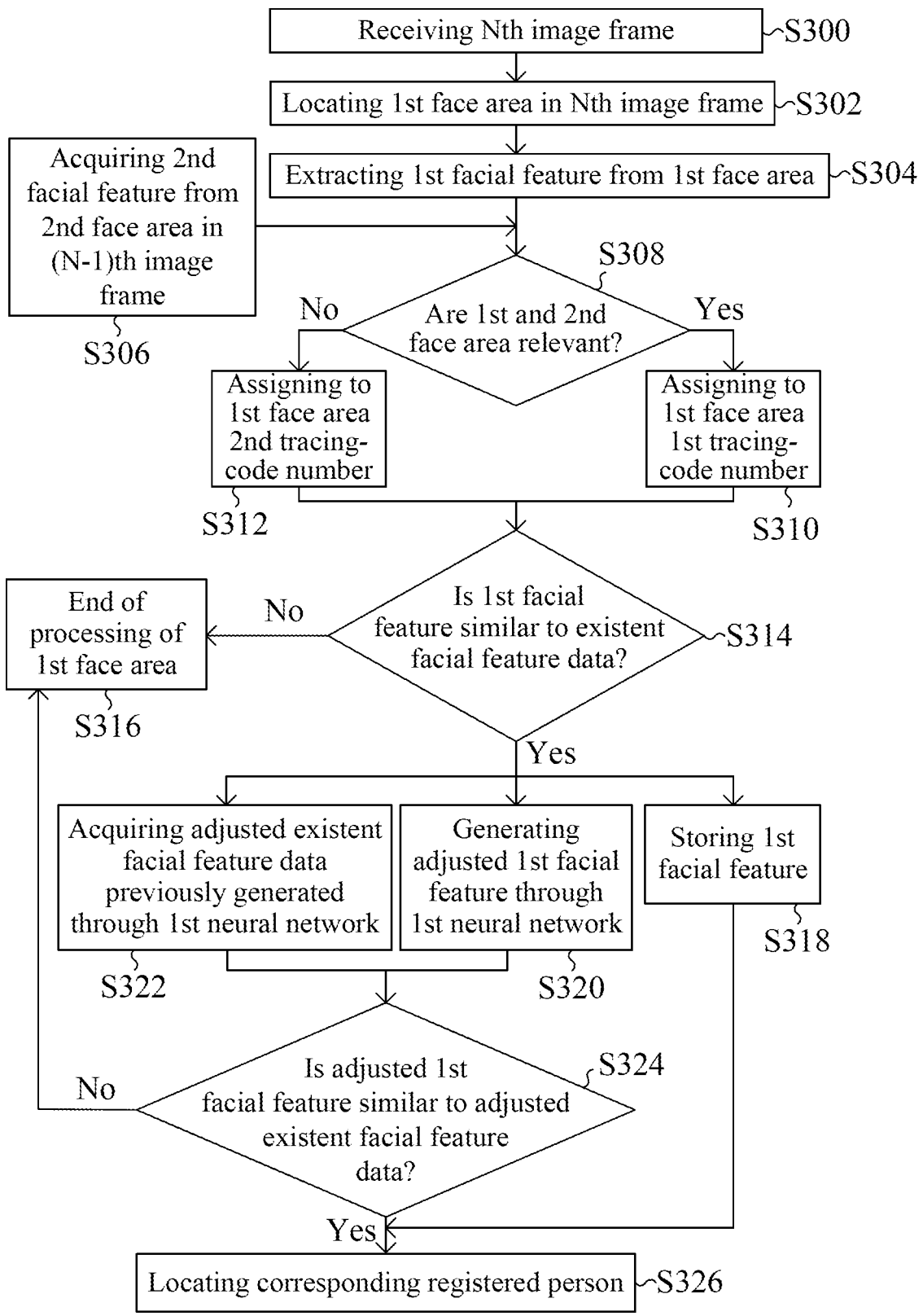
FIG. 3 is a schematic flowchart of a method for collecting facial recognition data according to an embodiment of the present invention.

It is to be noted that in the flowchart of FIG. 3, Step S306 is illustratively executed immediately before Step S308. However, in practice, the retrieval of the set of second facial features from the facial feature database 16 as illustrated in FIG. 3 can be executed at any time before Step S308.

Referring back to FIG. 3, after setting the tracing code in Step S310 or Step S312, the processing device 14 further determines whether the first facial feature is similar to any existent facial feature stored in the database 16 (Step S314). If the similarity of the first facial feature to each of the facial features stored in the database 16 is lower than a preset second level, it is indicated that the person owning the first facial feature does not have any facial recognition data registered in the database 16, and thus the processing device 14 finishes processing the first face area for saving load (Step S316). To protect privacy of the person who is not registered, all the recognition data in connection with this first face area shown in the Nth image frame will be discarded.

On the contrary, if the similarity of the first facial feature to a specified one of the facial features stored in the database 16 is higher than or equal to the preset second level, it is indicated that the person owning the first facial feature might be a registered one owning the specified facial feature. Therefore, in Step S318, the processing device 14 records the first facial feature and correlates the first facial feature to the tracing code determined in the Step S310 or S312. In addition to storing the first facial feature, the processing device 14 further inputs the first facial feature to a specifically designed first neural network, by which the first facial feature is derived into an adjusted first facial feature (Step S320). Meanwhile, other adjusted facial feature data previously generated by the first neural network are collected (Step S322). In this embodiment, the first neural network transforms an input involving a first number S of factors into an output involving a second number T of factors, wherein T is not smaller than S. In other words, if a facial feature, e.g. the first facial feature, contains S factors and is inputted into the first neural network, the first neural network would transform the facial feature into an adjusted one containing T factors.

Since the factor number T of the output is greater than or equal to the factor number S of the input, i.e. the factor number T of the output is not smaller than the factor number S of the input, the facial features belonging to two different persons would become more distinctive after being adjusted by the first neural network. In more detail, due to the transformation conducted by the first neural network, the spatial distance between the two facial features in a feature coordinate is enlarged. In other words, the first neural network functions to gather the facial features belonging to the same person in a specified region in the feature coordinate, and pull away the facial features belonging to different persons. As a result, the probability of highly correlation of a facial feature to two or more facial features can be reduced, and the recognition accuracy can be improved.

For example, the first neural network may be established according to Adaptor Topology and Re-constructor Topology and grows with machine learning. By way of Adaptor Topology, the data containing S factors is transformed into data containing T factors by projecting each point in the S-dimensional coordinate space onto a corresponding point in the T-dimensional coordinate space. In this way, the points associated with the same person can be gathered while the points associated with different persons can be pulled way. By way of the Re-constructor Topology, the operation is reversed. That is, the data containing T factors is transformed into data containing S factors by projecting each point in the T-dimensional coordinate space onto a corresponding point in the S-dimensional coordinate space. Meanwhile, the points in the T-dimensional coordinate space and the points in the S-dimensional coordinate space are kept in a one-to-one relationship, and distinctive factors of the data may not be lost due to the transformation. The details of the transformation described above can be realized by those skilled in the art, so it is not to be redundantly described herein.

After the adjusted first facial feature is obtained and the adjusted facial feature data previously generated by the first neural network are collected in Steps S320 and S322, the processing device 14 determines whether the person owning the first facial feature is a registered one in the database 16 or not according to the similarity of the adjusted first facial feature to the collected adjusted facial feature data (Step S324). If the similarity of the adjusted first facial feature to each of the collected adjusted facial feature data is lower than a preset third level, the processing device 14 determines that the person owning the adjusted first facial feature is not a registered one in the database 16. The flow proceeds to Step S316 to end processing of the first face area. On the other hand, if the similarity of the adjusted first facial feature to a specified one of the collected adjusted facial feature data is higher than or equal to the preset third level, the processing device 14 determines that the person owning the adjusted first facial feature is the one who has registered the specified adjusted facial feature (Step S326). Preferably, the first facial feature stored after Step S318 may be correlated to the person who has registered the specified adjusted facial feature so as to be included in the database 16. Then the first facial feature, or the image of the first face area in connection with the first facial feature, can be used as a material taking part in training the first neural network.

For improving accuracy of face recognition, the preset third level is preferably higher than the preset second level.

In view of the foregoing, it is understood that according to the present invention, correlations between successive image frames are referred to screen out facial areas that might belong to any previously registered person or persons. Afterwards, a series of recognition steps are executed to reconfirm the accuracy of the judgement. Once a person to be recognized is confirmed to be a registered one, the newly collected images or features in connection with the specified face area will be added to the database to serve as material for subsequent training of the neural network. It is expected that efficiency and accuracy of subsequent recognition can be improved by way of such a machine learning process.

In the above embodiment, an image stream is independently processed. Alternatively, two or more image streams may be referred to one another so that more training material can be obtained. For example, two or more of the image streams S1, S2 and S3 generated by different camera devices 120, 122 and 124 as shown in FIG. 1 may be cross-referenced to obtain more training material. Hereinafter, FIG. 5 in combination with FIG. 3 are referred to schematically illustrate such a method for collecting face recognition data according to the present invention.

After specifying a registered person from the database 16 by processing one of the image streams as described above, the processing device 14 processes the other image streams to confirm the recognition result. For example, as shown in FIG. 1, the processing device 14 receives the image streams S1, S2 and S3 from the cameras 120, 122 and 124, respectively. The image streams S1, S2 and S3 are picked up by the cameras 120, 122 and 124, which have respective shooting regions. The cameras 120, 122 and 124 are specifically allocated so that the shooting regions have an overlapping zone 150. Any person who exists in the overlapping zone 150 and is shown in each of the three image streams S1, S2 and S3 can be located according to environmental parameters such as relative positions of the cameras, shooting angles, reference objects in the environment, etc. Once the processing device 14 determines from the three image streams that a specified face area appears in a common physical position at the same time, the specified face area would be set to belong to the same person.

For example, when a Jth image frame of the image stream S1 and a Kth image frame of the image stream S2 are generated at the same time point, the processing device 14 will not process the Kth image frame of the image stream S2 until finishing processing all the face area simultaneously appearing in the Jth image frame of the image stream S1. After finishing processing all the face area simultaneously appearing in the Jth image frame of the image stream S1, the processing device 14 initially relates a face area appearing at a specific position of the Jth image frame to a specified person. If the specified person is a registered one in the database, the processing device 14 collects correlation data of the specific position to the specified person (Step S500).

Subsequently, the processing device 14 processes the image stream S2. In the Kth image frame generated at the same time as the Jth image frame, a position identically corresponding to the specific position in the Jth image frame is first located by referring to environmental parameters as mentioned above (Step S502). Whether a face area exists at the above-mentioned corresponding position or not is determined (Step S504). If such a face area does exist in the Kth image frame, the face area and facial features in connection with the corresponding position are correlated to the specified person (Step S506). Otherwise, the flow proceeds back to Step S500 to process another face area appearing at another specific position in the Kth image frame.

Figure 5:
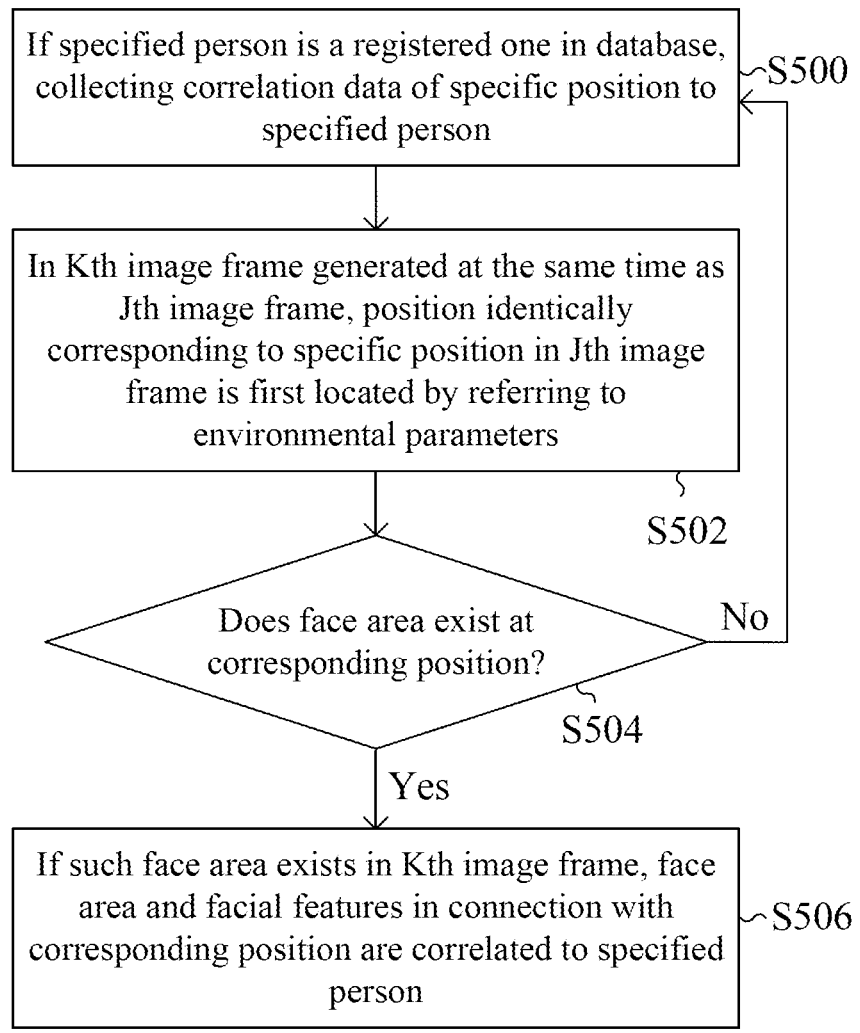
FIG. 5 is a schematic flowchart of a method for collecting facial recognition data according to another embodiment of the present invention.

By way of the method illustrated in FIG. 5, an image frame generated by a specified camera at a time point and processed earlier by the processing device 14 can be used to assist in image processing of another image frame generated by another specified camera at the same time point but processed later by the processing device 14. In this way, not only can it achieve the purpose of collecting data by combining multiple image streams, but it can also reduce some of the operations that need to be performed, thereby reducing the burden on the system.

It is understood from the above descriptions that according to the present invention, the method and system for collecting facial recognition data as described above locates one or more facial area belonging to the same person from successive image frames and collect the facial area data for analysis to identify that person. Then the images or facial features in connection with the one or more facial area of that person are collected as training material for facial recognition. Therefore, the method and system for collecting facial recognition data according to the present invention can gradually add facial recognition data into the database during a normal facial recognition process, effectively ameliorating problems caused by insufficient database.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for collecting facial recognition data from a first image stream, comprising:
    locating a first face area of a person to be recognized from an Nth image frame of the first image stream;
    extracting a first facial feature from the first face area, wherein the first facial feature is defined with S factors;
    acquiring a second facial feature extracted from a second face area shown in an (N−1)th image frame of the first image stream at a position corresponding to the first face area, wherein the (N−1)th image frame is generated prior to the Nth image frame;
    executing a first determining step to determine whether the first face area is relevant to the second face area or not, and assigning to the first face area a tracing code, whose number varies with a result of the determining step;
    executing a second determining step to determine whether to store the first facial feature according to a similarity level of the first facial feature to at least one existent facial feature data;
    storing the first facial feature and inputting the first facial feature into a first neural network to generate an adjusted first facial feature if the similarity level of the first facial feature to at least one existent facial feature data is determined to be higher than or equal to a preset level, wherein the adjusted first facial feature is defined with T factors, where T is not smaller than S;
    acquiring at least one adjusted existent facial feature data, each defined with the T factors and previously generated by inputting the at least one existent facial feature data defined with the S factors into the first neural network;
    executing a third determining step to determine whether the person to be recognized is a registered person or not according to a similarity level of the adjusted first facial feature to each of the at least one adjusted existent facial feature data; and
    using the stored first facial feature as a material for training the first neural network if the person to be recognized is determined to be a registered person.

2. The method according to claim 1, wherein the second facial feature and the at least one adjusted existent facial feature data are acquired from a database, in which correlation of the at least one existent facial feature data to at least one registered person is saved.

3. The method according to claim 1, wherein when the (N−1)th image frame contains another face area in addition to the second face area, the another face area is processed for facial recognition prior to the first face area.

4. The method according to claim 1, wherein after the first determining step:
the first face area is assigned with a first tracing-code number if it is determined in the first determining step that the first face area is relevant to the second face area; and
the first face area is assigned with a second tracing-code number if it is determined in the first determining step that the first face area is not relevant to the second face area,
wherein the second tracing-code number is a brand-new recognition number, and the first tracing-code number is the same number as that previously assigned to the second face area.

5. The method according to claim 1, further comprising a step of reconfirming the tracing code of the first face area according to a similarity level of the first facial feature of the first face area to the second facial feature of the second face area after it is determined in the first determining step that the first face area is relevant to the second face area.

6. The method according to claim 5, wherein the reconfirming step includes:
remaining the tracing code of the first face area to be the first tracing-code number if a similarity level of the first facial feature of the first face area to the second facial feature of the corresponding second face area is higher than or equal to a preset first level; and
using the brand-new number as the tracing code of the first face area if the similarity level of the first facial feature of the first face area to the second facial feature of the corresponding second face area is lower than the preset first level.

7. The method according to claim 1, wherein after the second determining step:
finishing processing the first face area if it is determined not to store the first facial feature as a similarity level of the first facial feature of the first face area to each of the at least one existent facial feature data is lower than a preset second level; and
storing the first facial feature and correlating the first facial feature to the tracing code assigned to the first face area if a similarity level of the first facial feature of the first face area to each of the at least one existent facial feature data is lower than the preset second level.

8. The method according to claim 7, wherein all recognition data in connection with the first face area shown in the Nth image frame are discarded while finishing processing the first face area.

9. The method according to claim 7, wherein after the third determining step:
finishing processing the first face area if it is determined that the person to be recognized is not a registered person as the similarity level of the adjusted first facial feature to each of the at least one adjusted existent facial feature data is lower than a preset third level; and
correlating the first facial feature stored in response to the second determining step to the registered person who has a specified one of the at least one adjusted existent facial feature data if the similarity of the adjusted first facial feature to the specified one of the at least one adjusted existent facial feature data is higher than or equal to the preset third level.

10. The method according to claim 9, wherein all recognition data in connection with the first face area shown in the Nth image frame are discarded while finishing processing the first face area.

11. The method according to claim 1, further comprising:
determining whether a third face area exists in a specified image frame of a second image stream at the same position where the first face area is disposed in the Nth image frame of the first image stream, wherein the specified image frame is generated at the same time as the Nth image frame;
acquiring a third facial feature previously extracted from the third face area and stored in a database; and
correlating the third facial feature to the person to be recognized.

12. A system for collecting facial recognition data, comprising:
a first image pickup device installed at a first position for picking up images from a first shooting region to generate a first image stream;
a facial feature database containing therein at least one existent facial feature data, each of which corresponds to a registered person; and
a processing device electrically connected to the first image pickup device and the facial feature database, and executing the method for collecting facial recognition data according to claim 1.

\* \* \* \* \*